(12) United States Patent
Kippe et al.

(10) Patent No.: US 6,234,195 B1
(45) Date of Patent: *May 22, 2001

(54) CHECK VALVE FOR FUEL TANK FILL PIPE

(75) Inventors: Bradley N. Kippe, Holly; Barry L. Thater, Oxford, both of MI (US)

(73) Assignee: Saturn Electronics & Engineering, Inc., Auburn Hills, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,480

(22) Filed: Jul. 20, 1998

(51) Int. Cl.$^7$ ..................................................... F16K 17/19
(52) U.S. Cl. .................................... 137/493.3; 137/527.6; 137/588
(58) Field of Search ................................. 137/527, 527.6, 137/854, 855, 856, 493.3, 493.4, 588

(56) References Cited

U.S. PATENT DOCUMENTS

| | | | |
|---|---|---|---|
| 2,864,394 | * 12/1958 | Hempel | 137/855 |
| 3,382,889 | * 5/1968 | Heinz et al. | 137/855 |
| 3,809,119 | 5/1974 | Cave | 137/527.8 |
| 3,971,406 | * 7/1976 | Inada et al. | 137/493.4 |
| 4,153,073 | * 5/1979 | Deters | 137/493.4 |
| 4,304,265 | 12/1981 | Sell | 137/856 |
| 4,433,702 | 2/1984 | Baker | 137/527.6 |
| 5,327,933 | 7/1994 | Ishikawa et al. | 137/527.6 |
| 5,462,100 | 10/1995 | Covert et al. | 141/59 |
| 5,590,697 | 1/1997 | Benjey et al. | 141/59 |
| 5,630,445 | 5/1997 | Horiuchi et al. | 137/592 |
| 5,775,357 | * 7/1998 | Regna et al. | 137/527.6 |

FOREIGN PATENT DOCUMENTS

| | | |
|---|---|---|
| 597 544 | 3/1976 | (CH) . |
| 2625 057 | 7/1975 | (DD) . |

* cited by examiner

*Primary Examiner*—Stephen M. Hepperle

(57) ABSTRACT

A one-piece check valve is provided for a fuel filler pipe connected to a vehicle fuel tank to provide a fuel filling passage communicated to the fuel tank. The check valve comprises a thin sheet of material shaped to comprise a mounting portion, a flapper valve and an intermediate connecting portion that connects the flapper valve and the mounting portion with the connecting portion being contoured so as to normally impart a spring bias to the flapper valve to close off the fuel filling passage. An elastomeric seal is fastened on the flapper valve or on the fill pipe in a manner to provide a liquid fuel and vapor tight seal when the flapper valve is in a closed position relative to the fuel filling passage. The flapper valve is opened when fuel is introduced into the fuel filler pipe to permit fueling of said tank.

24 Claims, 5 Drawing Sheets

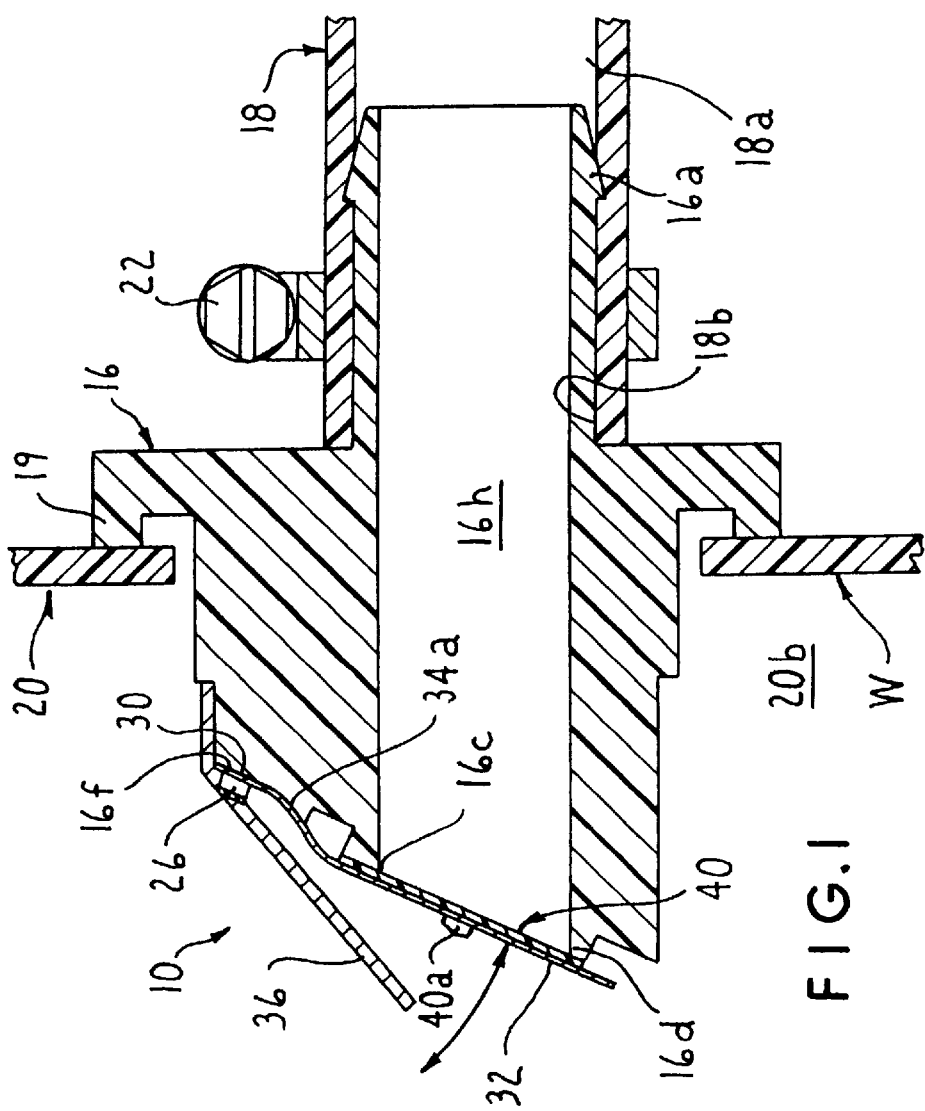
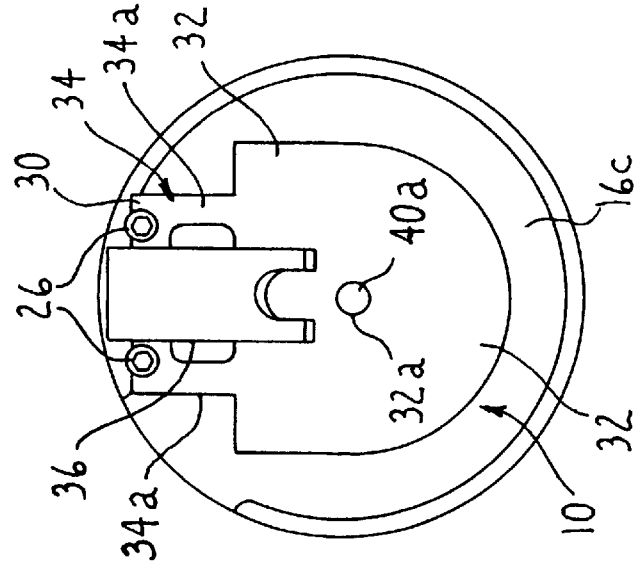
FIG. 1
FIG. 2

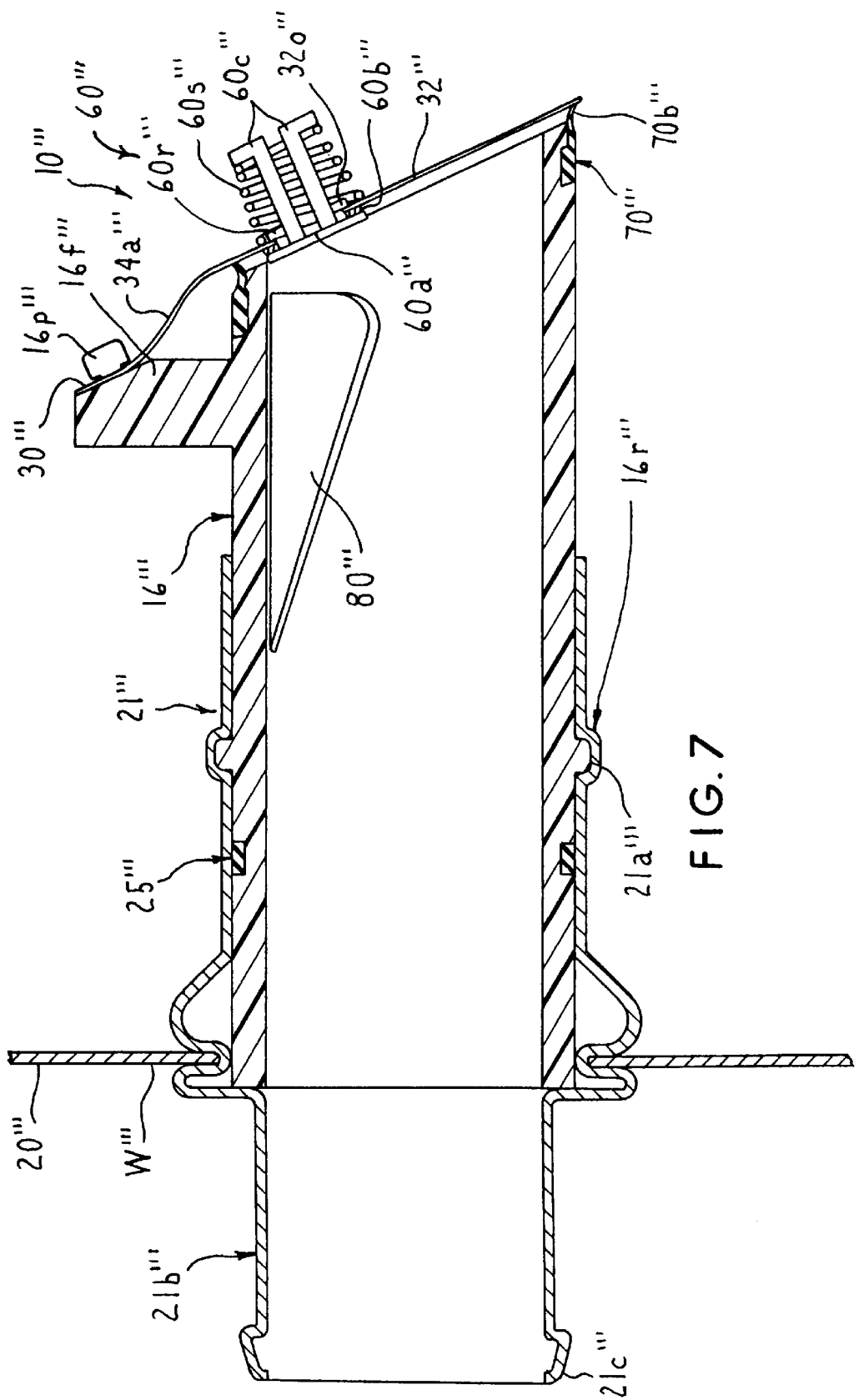

CHECK VALVE FOR FUEL TANK FILL PIPE

FIELD OF THE INVENTION

The present invention relates to a liquid and vapor tight check valve for use with the fuel fill pipe of a fuel tank of a vehicle, such as an automobile.

BACKGROUND OF THE INVENTION

Check valves have been proposed for use with the fuel filler pipe of automobiles and other vehicles to prevent liquid fuel from flowing back upwardly to the exterior fuel filler port of the vehicle as a result of an increase in fuel tank pressure. One such check valve is described in U.S. Pat. No. 5,327,933 and involves a valve plate that is pivotally mounted on a separate hinge pin at the lower end of the filler pipe communicating with the fuel tank. The valve plate is biased by a separate torsion coil spring disposed on the hinge pin to a closed position relative to the fuel filler pipe. The valve is moved to an open position against bias of the coil spring by liquid fuel introduced into the filler pipe by the usual fuel filler nozzle at a fuel filling station.

Current governmental concerns regarding side impact vehicle collisions may result in adoption of vehicle regulations that require a fuel check valve in the fuel filler pipe in order to prevent liquid fuel escaping from the exterior fuel filler port of the vehicle via the filler pipe during side impact collision testing.

In general, a fuel filler pipe check valve must prevent fuel vapor from flowing out of the fuel tank filler pipe during driving of the vehicle, must prevent liquid fuel from flowing out of the filler pipe during fuel filling, vehicle driving, and vehicle rollover resulting from side impact collisions, and must be openable during filling of the fuel tank to an extent to permit rapid fueling of the tank.

An object of the present invention is to provide a fuel check valve for use with a fuel filler pipe of a vehicle that provides these functions, that is low in cost, and that is simple to manufacture in a mass production environment.

SUMMARY OF THE INVENTION

The present invention in an illustrative embodiment provides a fuel check valve for use with a fuel filler pipe of a vehicle wherein the check valve comprises a thin spring-type flapper valve component having an optional resilient seal fastened thereon in a manner to provide a one-piece check valve for assembly relative to a fuel filler pipe of a fuel tank of a vehicle. An optional resilient seal alternately may be disposed on the fuel fill pipe in a position to engage the flapper valve in another illustrative embodiment of the invention. Another illustrative embodiment of the invention envisions a flapper valve directly engaging the fuel fill pipe.

In a particular illustrative embodiment of the present invention, the check valve is formed from a thin sheet of material to have a mounting portion by which the check valve is mounted to a fuel filler pipe, or a fuel filler pipe-to-fuel tank connection and an integrally formed flapper valve that is connected to the mounting portion by an intermediate connecting spring portion in a manner that the flapper valve is normally biased to close off the fuel filling passage to the fuel tank. The flapper valve or fuel fill pipe has a resilient (e.g. elastomeric) seal fastened thereon for providing a liquid and fuel vapor tight seal between the flapper valve and fill pipe when the flapper valve is in the closed position. The flapper valve is movable to an open position against spring bias by liquid fuel introduced into the filler pipe by the usual fuel filler nozzle at a fuel filling station. The flapper valve may cooperate with a stop member disposed on a side of the flapper valve opposite from the resilient seal to define an open position of the flapper valve when fuel is supplied to the filler pipe for fuel tank filling.

The flapper valve can include a pressure relief valve thereon in a manner to vent excess fuel vapor pressure that may develop in the fuel tank to the fuel fill pipe. The fuel fill pipe can include multiple siphon ribs that extend along a length of the filler pipe proximate the flapper valve for directing a siphon tube past the flapper valve into the fuel tank as needed to siphon fuel therefrom.

The present invention may be better understood when considered in view of the following detailed description of illustrative embodiments taken with the following drawings.

DESCRIPTION OF THE DRAWINGS

FIG. 1 is a cross-sectional view of the end of a filler pipe connected to a vehicle fuel tank by a filler pipe-to-fuel tank connection showing a check valve pursuant to an illustrative embodiment of the invention in the closed position.

FIG. 2 is an elevational view of the check valve of FIG. 1 mounted on the filler pipe-to-fuel tank connection.

FIG. 7 is a sectional view of the end of a filler pipe connection having a elastomer sealing grommet thereon and having a check valve pursuant to still another illustrative embodiment of the invention in the closed position and having a pressure relief valve thereon.

DESCRIPTION OF THE INVENTION

Figure 3:
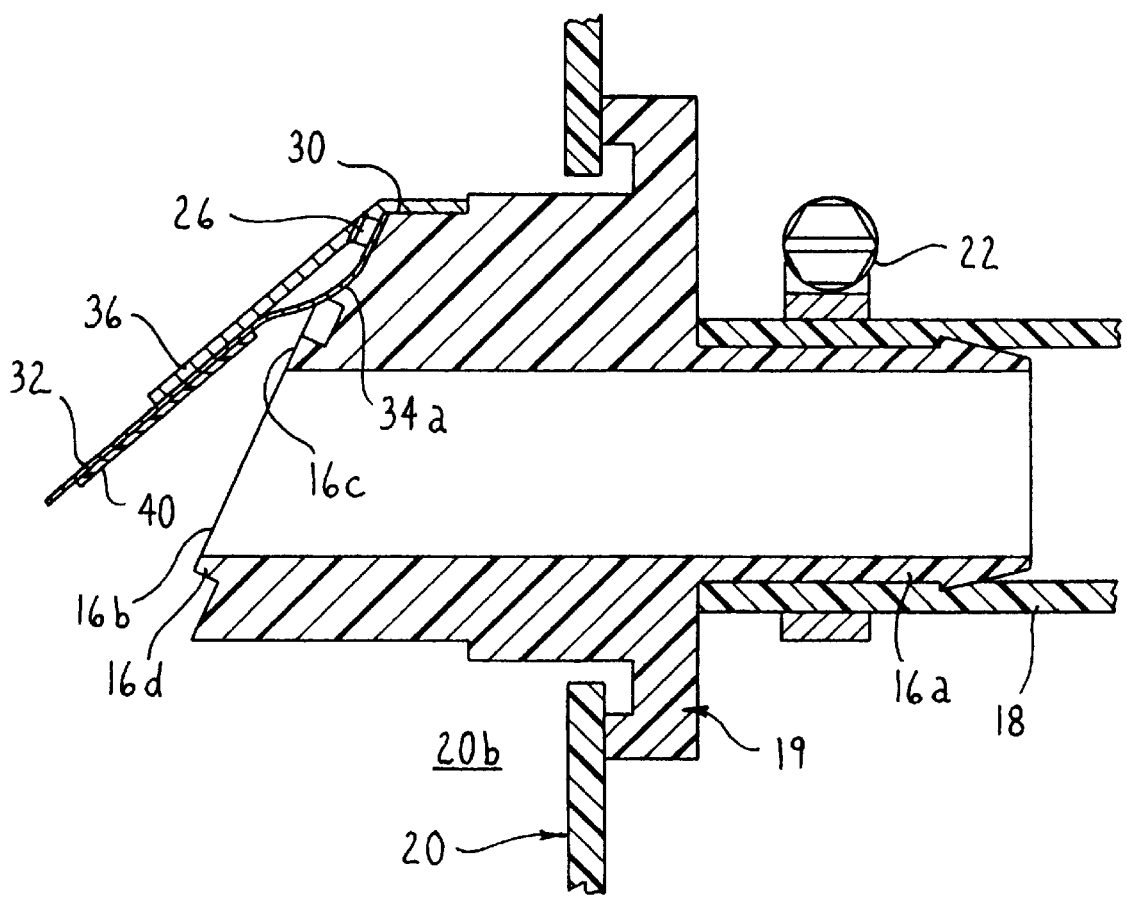
FIG. 3 is a cross-sectional view of the end of a fuel filler pipe connected to a vehicle fuel tank by a filler pipe-to-fuel tank connection showing the check valve in the full open position.

Referring to FIGS. 1–3, a check valve 10 in accordance with an illustrative embodiment of the invention is shown disposed on a tubular fuel fill pipe connection 16 of a fuel fill pipe 18 that supplies liquid fuel to the fuel tank 20. To this end, the fill pipe 18 defines a fuel filling passage 18a communicated to the interior of the fuel tank 20. The fuel fill pipe 18 can comprise a conventional fuel fill pipe made of plastic, metal (e.g. steel), rubber and the like and the fuel tank 20 can comprise a conventional metal (e.g. steel) or plastic (e.g. HDPE-high density polyethylene) fuel tank in widespread use on automobiles, pick-up trucks and the other vehicles.

For a plastic or rubber fuel fill pipe 18 and plastic fuel tank 20, the filler pipe-to-fuel tank connection 16 typically comprises a molded plastic material (e.g. HDPE) and includes a tubular male connector portion 16a that is sealably inserted and received in the open end 18b of the fill pipe 18 and held therein by press fit or by a conventional clamp 22 tightened about the exterior of the fill pipe 18. The connection 16 typically includes an annular circumferential flange 19 that is hot plate welded to the wall W of the fuel tank 20.

The fill pipe-to-fuel tank connection 16 includes open end 16c that resides in the interior chamber 20b of the fuel tank 20 such that the fuel filling passage 18a is communicated to the fuel tank chamber 20b. The open end 16c includes an end surface 16b that defines an annular valve seat 16d about the end of the fuel filling passage 16h of fill pipe connection 16 and fuel filling passage 18a of fill pipe 18.

The check valve 10 is mounted on the open end 16c by a pair of threaded fasteners 26. In particular, a laterally elongated mounting portion 30 of the check valve is mounted to a molded flat shoulder 16f of the open end surface by two screws as shown best in FIGS. 1 and 2.

The check valve 10 comprises a thin sheet of spring material (e.g. thin spring Type 302 stainless steel sheet having a thickness of 0.008 inch) shaped or formed to include the mounting portion 30, a flapper valve 32, and an intermediate connecting spring portion 34 that connects the flapper valve and the mounting portion. The thin sheet of spring material typically is formed to include the mounting portion 30, flapper valve 32, and connecting spring portion 34 from a single sheet of spring material by conventional metal pressing techniques, such as stamping, or by plastic molding techniques if the check valve is made of plastic material.

The connecting spring portion 34 is bifurcated to include a pair of contoured spring legs 34a that interconnect the mounting portion 30 and the flapper valve 32. The spring legs 34a are contoured so as to normally impart a spring bias to the flapper valve 32 to close off the annular valve seat 16d. To this end, in one illustrative embodiment, the flapper valve 32 comprises a generally flat valve plate having an elastomeric or other resilient thin flat sheet-type seal 40 fastened on an inner side thereof facing the valve seat 16d for sealing on the valve seat in a manner to provide a liquid fuel and vapor tight seal when the flapper valve 32 is biased by the connecting spring portion 34 to the closed position in FIG. 1.

The resilient seal 40 is fastened to the inner side of the flapper valve 32 by a bulbous region 40a of the seal 40 being received with interference fit in an opening 32a in the flapper valve 32 as shown best in FIGS. 1 and 2. Alternately, the seal 40 could be molded onto the flapper valve. The resilient seal 40 comprises an elastomeric sheet material comprising nitrile, fluorosilicone, fluorocarbon and the like and having a nominal thickness of about 0.020 inch.

The flapper valve 32 is fully openable against the bias of the connecting spring portion 34 in response to liquid fuel being introduced into the fuel fill pipe 18 to permit rapid fueling of the fuel tank 20. The thin sheet of spring material can be formed to cooperate with a stop member 36 disposed on an outer side of the flapper valve 32 opposite from the resilient seal 40 as shown best in FIGS. 1 and 2. The stop member 36 defines a full open position of the flapper valve 32 as shown in FIG. 3 when liquid fuel is introduced into the fuel filler pipe 18 to permit rapid fueling of the fuel tank 20. The stop member 36 can be formed separately from the mounting portion 30 and fastened thereto or to the connection 16, or be formed integrally with the mounting portion 30.

The check valve 10 functions to prevent fuel vapor from flowing out of the fuel fill pipe 18 to ambient atmosphere during driving of the vehicle and prevents liquid fuel from flowing out of the fill pipe 18 to ambient atmosphere during fuel filling, vehicle driving, and vehicle rollover resulting from side impact collisions. The check valve 10 can be fully opened during filling of the fuel tank to permit rapid fueling of the tank.

Figure 4:
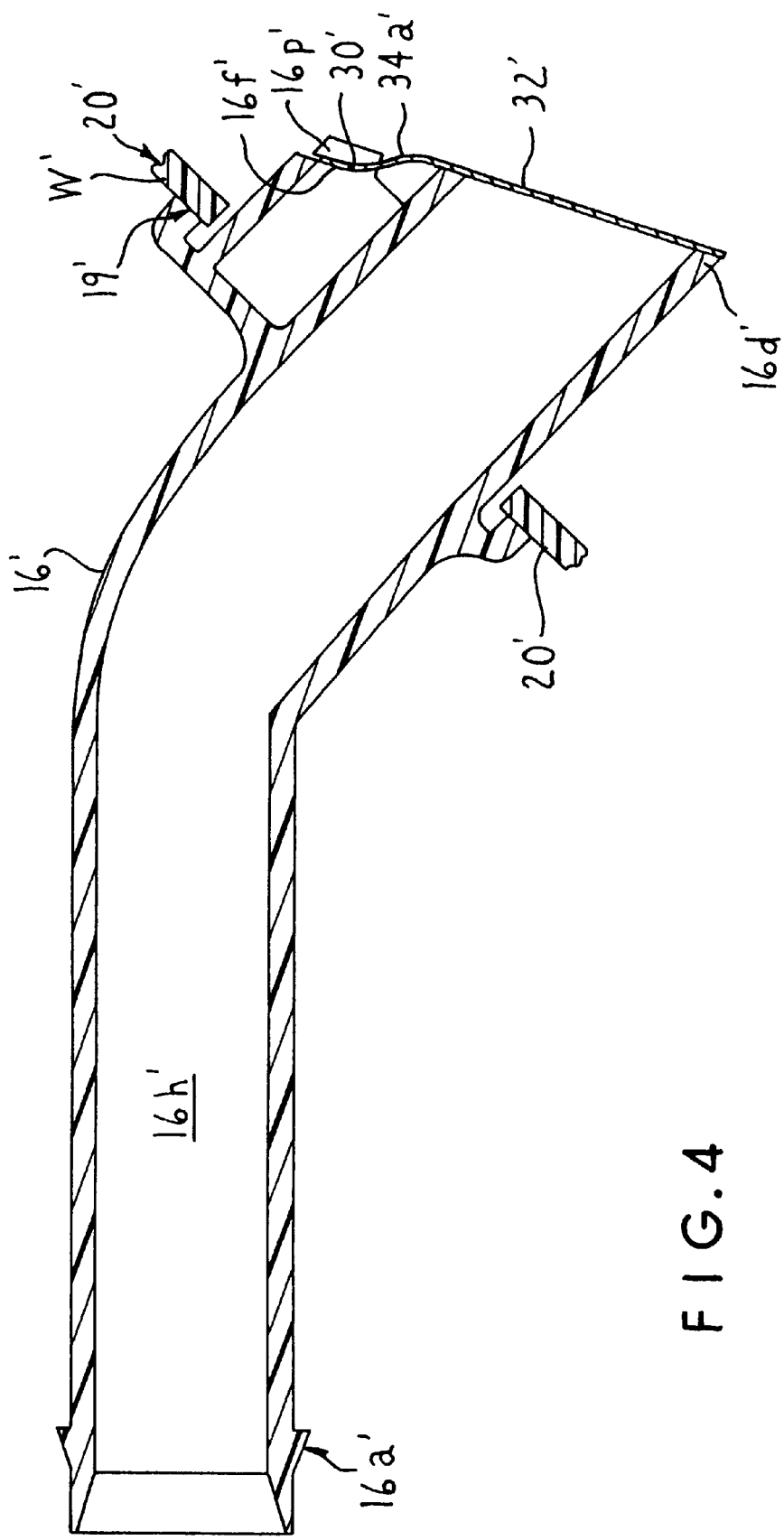
FIG. 4 is a cross-sectional view of the end of a filler pipe connection for connection to a vehicle fuel tank showing a check valve pursuant to another illustrative embodiment of the invention in the closed position.

FIG. 4 illustrates another embodiment of the invention for welding to a plastic fuel tank 20' and similar to that of FIGS. 1–4 with, however, the elastomeric seal being deleted from the flapper valve so that the flat surface of the flapper valve 32', which may be stainless steel or plastic, seals directly on the annular lip defining valve seat 16d' of the plastic fill pipe connection 16', which may be made of high density polyethylene (HDPE) and includes an end 16a' connected to the fill pipe (not shown) like fuel fill pipe 18 of FIG. 1. In FIG. 4, like features of FIGS. 1–3 are represented by like reference numerals primed. The flapper valve 32' includes laterally elongated mounting portion 30' that is mounted to a molded upstanding pedestal or shoulder 16f' formed (e.g. molded) integrally with connection 16' by snap fitting in position or by a heat staked flapper valve attachment post 16p' in a manner shown, for example, in FIG. 5. The fill pipe connection 16' includes an integrally molded circumferential flange 19' that is hot plate welded to the wall W' of the plastic fuel tank 20'. The flapper valve 32' functions in the manner described above with respect to flapper 32 of FIGS. 1–3 to prevent fuel vapor from flowing out of the fuel fill pipe 18' to ambient atmosphere during driving of the vehicle and prevents liquid fuel from flowing out of the fill pipe 18' to ambient atmosphere during fuel filling, vehicle driving, and vehicle rollover resulting from side impact collisions.

Figure 5:
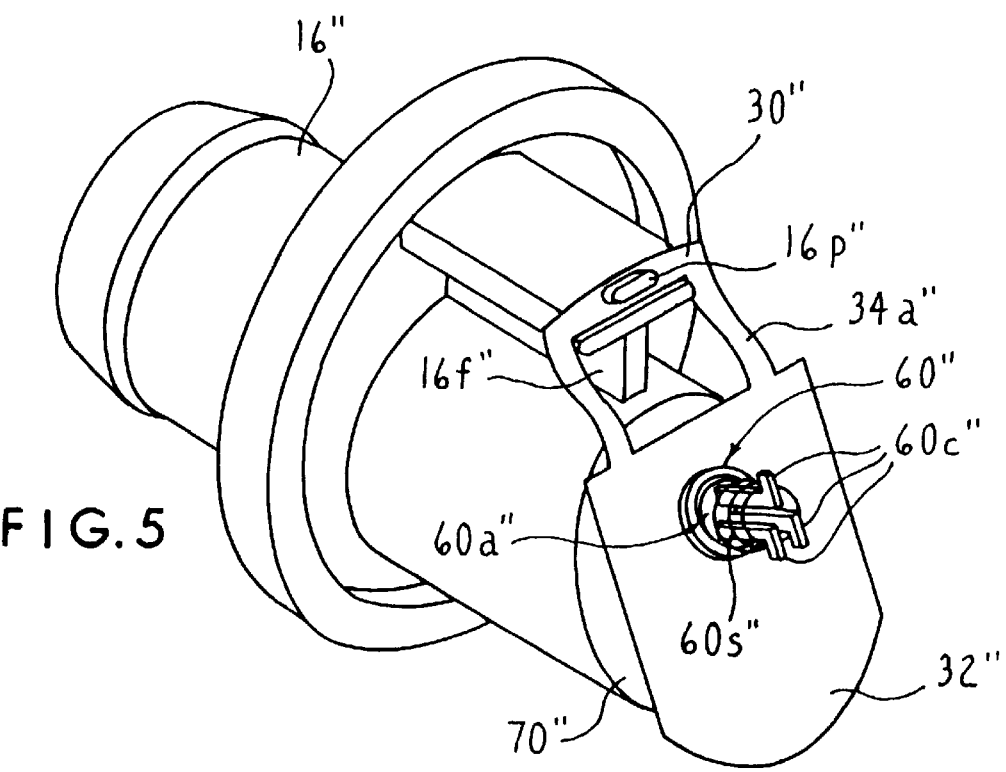
FIG. 5 is a perspective view of a filler pipe connection for connection to a vehicle fuel tank and having a check valve pursuant to still another illustrative embodiment of the invention in the closed position and having a pressure relief valve thereon.
Figure 6:
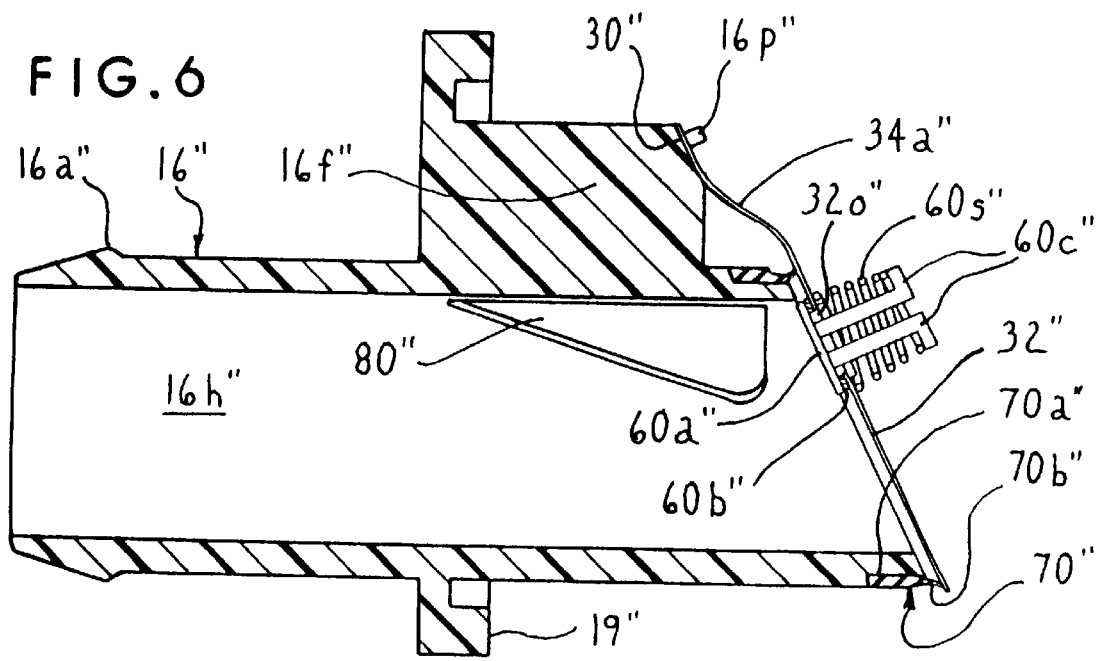
FIG. 6 is a sectional view of the check valve of FIG. 6 showing the pressure relief valve thereon.

FIGS. 5–6 illustrate still another embodiment of the invention where like features of previous Figures are represented by like reference numerals double primed and that includes a pressure release or relief valve 60" disposed on the flapper valve 32" and a tubular elastomer seal grommet 70" on the end of the HDPE or other fill pipe connection 16" for engaging the facing surface of the flapper valve 32". The cylindrical tubular grommet comprises nitrile, fluorosilicone, fluorocarbon and the like and includes a mounting body 70a" that is friction fit on the end of the fill pipe connection 16" and a thinner tubular lip 70b" for sealingly engaging the facing surface of the flapper valve 32" as shown. The mounting body 70a" can have a wall thickness of 0.080 inch for example only while the lip 70b" can have a wall thickness of 0.020 inch for example only. The pressure release valve 60" comprises a valve head 60a" having annular elastomer seal 60b" held thereon by adhesive, a seal retainer, or other means for engaging the flapper valve 32" for closing off an orifice or opening 32o" therein defined by a valve seat in the flapper valve 32". The valve head 60a" includes multiple posts 60c" extending normal to the flapper valve 32" with the valve head 60a" biased normally closed by a coil spring 60s" disposed between the posts 60c" and the flapper valve. The pressure release valve 60" will open when the vapor pressure in the fuel tank 20" exceeds a preselected tank vapor pressure to open the valve 60" against the bias of coil spring 60s" so as to vent excess fuel vapor through the orifice 32o" into the fill pipe connection 16" and fill pipe 18". Features of the pressure relief valve 60" are shown in more detail in FIG. 7 where like features are represented by like reference numerals triple primed.

The fill pipe connection 16" includes one or more elongated siphon ribs 80" (one shown) that extend along a length of the fill pipe connection 16" proximate the heat staked flapper valve attachment post 16p' and expand in width toward the flapper valve 32' in order to direct a flexible fuel siphon tube (not shown) that may be inserted into the fill pipe connection 16" to pass by the flapper valve 32' in a manner toward the freely pivotable region of the flapper valve to enter the fuel tank in order that fuel can be siphoned therefrom as needed. The ribs 80" can be integrally molded parallel to one another about the inner circumference of the connection 16".

The fill pipe connection 16" includes an integrally molded circumferential flange 19' that is hot plate welded to the wall (e. g. W' of FIG. 4) of the plastic fuel tank in a manner described for the embodiment of FIG. 4.

FIG. 7 illustrates a further embodiment of the invention for connection to a steel or other metal fuel tank 20'''. Like features of previous Figures are represented by like reference numerals triple primed. The check valve 10''' is mounted on a filler pipe connection 16''' by a formed steel or other metal connector tube 21''' crimped or otherwise deformed onto the connection 16" and to the wall W''" of the fuel tank 20''' in the manner shown. The connection 16''' includes a circumferential crimp bead 16r''' that mates with a groove 21a''' of the connector tube 21" to provide a mechanical joint therebetween. A resilient O-ring seal 25''' is provided between the tubular connector 21''' and the connection 16" to provide a liquid fuel tight seal therebetween. The connector tube 21''' includes a stub end 21b''' that is sealingly fit into the fuel fill pipe (not shown) by insertion of barbed end 21c''' therein.

In FIG. 7, the pressure release valve 60''' and siphon tube-directing ribs 80''' are similar to those described hereabove and are optionally present on the flapper valve 32''' and fill pipe connection 16''', respectively. For example, the pressure release valve 60''' comprises a valve head 60a''' having annular elastomer seal 60b''' held thereon by seal retainer 60r''' fastened on the pressure relief valve to this end, adhesive or other means for engaging the flapper valve 32''' for closing off an orifice or opening 32o''' therein defined by a valve seat in the flapper valve 32'''.

The check valves described above in FIGS. 4–7 function in the manner described above with respect to check valve of FIGS. 1–3 to prevent fuel vapor from flowing out of the fuel fill pipe to ambient atmosphere during driving of the vehicle and prevents liquid fuel from flowing out of the fuel fill pipe to ambient atmosphere during fuel filling, vehicle driving, and vehicle rollover resulting from side impact collisions.

A check valve pursuant to the invention is advantageous in that it can comprise a one-piece check valve assembly of the flapper valve with optional resilient seal and optional pressure release valve for assembly to the filler pipe-to-fuel tank connection. The check valve can be fastened to the fuel pipe connection or directly to the fuel fill pipe if it extends to the fuel tank. The check valve is low in cost and simple to manufacture in a mass production environment as a result of forming the mounting portion, flapper valve, and connecting spring portion from a single piece of spring material and then joining the optional flat resilient seal and pressure relief valve to the flapper valve.

Although the invention has been shown and described with respect to certain embodiments, it should be understood by those skilled in the art that various changes, modifications in the form and detail thereof may be made therein without departing from the spirit and scope of the invention as set forth in the appended claims.

We claim:

1. A check valve for a fuel fill pipe connected to a vehicle fuel tank to provide a fuel filling passage communicated to the fuel tank, comprising a flapper valve disposed for pivotal movement relative to the fuel fill pipe for normally closing off said fuel filling passage to said fuel tank and being opened when fuel is introduced into the fuel fill pipe to permit fueling of said tank, said flapper valve including a mounting portion by which the flapper valve is disposed relative to said fuel filling passage and an intermediate connecting spring portion that connects said flapper valve to said mounting portion, said mounting portion, connecting portion and flapper valve being formed integrally solely of a single sheet of spring material and said connecting portion being contoured so as to normally impart a spring bias to said flapper valve to close off said fuel filling passage.

2. The check valve of claim 1 wherein said flapper valve cooperates with stop member disposed on a side of said flapper valve opposite from said seal for defining an open position of said flapper valve when liquid fuel is introduced into said filler pipe.

3. The check valve of claim 1 wherein said mounting portion is connected to an end portion of said fuel filler pipe residing in said fuel tank.

4. The check valve of claim 1 wherein said mounting portion is connected to an end portion of a filler pipe connection joining said filler pipe and said fuel tank.

5. The check valve of claim 4 further including fastener means for mechanically connecting said mounting means to said end portion of said fill pipe or connection thereto.

6. The check valve of claim 1 wherein said connecting portion comprises a plurality of laterally spaced apart spring legs.

7. The check valve of claim 6 wherein said resilient seal comprises a tubular elastomeric seal proximate an end of the filler tube and having an outer annular lip for engaging the surface of the flapper valve.

8. The check valve of claim 1 that includes a stop member formed integrally on said mounting portion to control movement of said flapper valve.

9. A check valve for a fuel fill pipe connected to a vehicle fuel tank to provide a fuel filling passage communicated to the fuel tank, comprising a thin sheet of material shaped to comprise a mounting portion, flapper valve and an intermediate connecting portion that connects said flapper valve and said mounting portion, said connecting portion including a Plurality of laterally spaced apart spring legs contoured so as to normally impart a spring bias to said flapper valve to close off said fuel filling passage, and a resilient seal on a side of said flapper valve in a manner to provide a liquid fuel and vapor tight seal when said flapper valve is in a closed position relative to said fuel filling passage, said flapper valve being opened when fuel is introduced into the fuel fill pipe to permit fueling of said tank.

10. The check valve of claim 9 wherein said flapper valve cooperates with a stop member disposed on a side of said flapper valve opposite from said seal for defining an open position of said flapper valve when liquid fuel is introduced into said filler pipe.

11. The check valve of claim 9 wherein said mounting portion is connected to an end portion of said fuel filler pipe.

12. The check valve of claim 11 wherein said mounting portion is connected to an end portion of a filler pipe connection to said fuel tank.

13. The check valve of claim 12 further including fastener means for mechanically connecting said mounting means to said connection.

14. The check valve of claim 9 wherein a resilient seal is mounted on said flapper valve or said fuel fill pipe or connection thereto.

15. The check valve of claim 14 wherein said resilient seal comprises an elastomeric seal member fastened to said flapper valve by a bulbous region of said elastomeric seal received with interference fit in an opening in said flapper valve.

16. The check valve of claim 14 wherein the seal comprises a material selected form the group consisting of nitrile, fluorosilicone, and fluorocarbon.

17. The check valve of claim 14 wherein said resilient seal comprises a tubular elastomeric seal proximate an end of the filler tube and having an outer annular lip for engaging the surface of the flapper valve.

18. A check valve for a fuel fill pipe connected to a vehicle fuel tank to provide a fuel filling passage communicated to the fuel tank, comprising a resilient seal disposed on the fuel fill pipe and a flapper valve disposed for pivotal movement to engage said resilient seal to normally close off said fuel filling passage to said fuel tank and being opened when fuel is introduced into the fuel fill pipe to permit fueling of said tank, said flapper valve including a mounting portion by which the flapper valve is disposed relative to said fuel filling passage and an intermediate connecting spring portion that connects said flapper valve to said mounting portion, said mounting portion, connecting portion and flapper valve being formed integrally and said connecting portion being contoured so as to normally impart a spring bias to said flapper valve to close off said fuel filling passage.

19. A check valve for a fuel fill pipe connected to a vehicle fuel tank to provide a fuel filling passage communicated to the fuel tank, comprising a flapper valve disposed for pivotal movement relative to the fuel fill pipe for normally closing off said fuel filling passage to said fuel tank and being opened when fuel is introduced into the fuel fill pipe to permit fueling of said tank, said flapper valve including a mounting portion by which the flapper valve is disposed relative to said fuel filling passage and an intermediate connecting spring portion that connects said flapper valve to said mounting portion, said mounting portion, connecting portion and flapper valve being formed integrally and said connecting portion being contoured so as to normally impart a spring bias to said flapper valve to close off said fuel filling passage, said flapper valve including a pressure release valve thereon.

20. A check valve for a fuel fill pipe connected to a vehicle fuel tank to provide a fuel filling passage communicated to the fuel tank, comprising a flapper valve disposed for pivotal movement relative to the fuel fill pipe for normally closing off said fuel filling passage to said fuel tank and being opened when fuel is introduced into the fuel fill pipe to permit fueling of said tank, said flapper valve including a mounting portion by which the flapper valve is disposed relative to said fuel filling passage and an intermediate connecting spring portion that connects said flapper valve to said mounting portion, said mounting portion, connecting portion and flapper valve being formed integrally and said connecting portion being contoured so as to normally impart a spring bias to said flapper valve to close off said fuel filling passage, and siphon ribs in said fuel filling passage for directing a siphon tube inserted therein toward a freely pivoting edge of said flapper valve.

21. A check valve for a fuel fill pipe connected to a vehicle fuel tank to provide a fuel filling passage communicated to the fuel tank, comprising a flapper valve disposed for pivotal movement relative to the fuel fill pipe for normally closing off said fuel filling passage to said fuel tank and being opened when fuel is introduced into the fuel fill pipe to permit fueling of said tank, said flapper valve including a mounting portion by which the flapper valve is disposed relative to said fuel filling passage and an intermediate connecting spring portion that connects said flapper valve to said mounting portion, said mounting portion, connecting portion and flapper valve being formed integrally and said connecting portion including a plurality of laterally spaced apart spring legs contoured so as to normally impart a spring bias to said flapper valve to close off said fuel filling passage.

22. The check valve of claim 21 wherein said resilient seal comprises an elastomeric seal member fastened to said flapper valve by a bulbous region of said elastomeric seal received with interference fit in an opening in said flapper valve.

23. A check valve for a fuel fill pipe connected to a vehicle fuel tank to provide a fuel filling passage communicated to the fuel tank, comprising a flapper valve disposed for pivotal movement relative to the fuel fill pipe for normally closing off said fuel filling passage to said fuel tank and being opened when fuel is introduced into the fuel fill pipe to permit fueling of said tank, said flapper valve including a mounting portion by which the flapper valve is disposed relative to said fuel filling passage and an intermediate connecting spring portion that connects said flapper valve to said mounting portion, said mounting portion, connecting portion and flapper valve being formed integrally and said connecting portion being contoured so as to normally impart a spring bias to said flapper valve to close off said fuel filling passage, said flapper valve including a resilient seal on a side thereof facing a sealing surface of said fuel filing passage and being configured so as to overlie only said side and not said connecting portion and said mounting portion.

24. The check valve of claim 23 wherein said seal engages an annular sealing surface of said fuel filling passage when said flapper valve is in a closed position relative to said fuel filling passage.

* * * * *